United States Patent Office 3,483,216
Patented Dec. 9, 1969

3,483,216
2,2-DISUBSTITUTED 3-ACYL-5-AMINO-THIA-
ZOLIDINE-4-CARBOXYLIC ACIDS
Robert Burns Woodward, 12 Oxford St.,
Cambridge, Mass. 02138
No Drawing. Filed Aug. 22, 1966, Ser. No. 573,890
Claims priority, application Switzerland, Sept. 10, 1965,
12,623/65; Dec. 9, 1965, 16,971/65
Int. Cl. C07d 91/16
U.S. Cl. 260—306.7          14 Claims

ABSTRACT OF THE DISCLOSURE

Process for the preparation of ureathane compounds, such as the compound V, infra, by reacting a saturated cyclic α-hydrazino-thioether in which the hydrazino group is N,N′-disubstituted by esterified carboxyl groups, for example, the compound of the Formula IV, infra, with a nitrosating agent, and treating the resulting product with a basic agent and, if desired, converting substituents present in a resulting compound into other substituents, and/or, if desired, resolving a resulting mixture of isomers into its component isomers. The invention also includes the products obtained by the process, said process being useful for the preparation of 7-amino-cephalosporanic acid and derivatives thereof.

---

The present invention provides a method process for the manufacture of urethane compounds, which was used in the manufacture of valuable intermediates and especially in the first production of synthetic 7-amino-cephalosporanic acid and of its derivatives, and which lends itself specially well to this peculiar synthesis.

7-amino-cephalosporanic acid corresponds to the formula

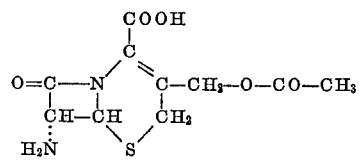

XV

Derivatives are in the first place N-acyl compounds in which the acyl radicals are primarily those of pharmacologically active N-acyl derivatives of 7-amino-cephalosporanic acid, such as the thienylacetyl, e.g. 2-thienylacetyl, cyanoacetyl, chlorethylcarbamyl or phenylacetyl radical, or readily eliminable acyl radicals, such as the residue of a carbonic acid semiester, for example the tertiary butyloxycarbonyl residue.

The synthesis of this compound and its derivatives, which are of importance to the manufacture of valuable intermediates, is based on the conception to use a 3,5-unsubstituted 2,2-disubstituted thiazolidine-4-carboxylic acid, for example, a compound of the formula

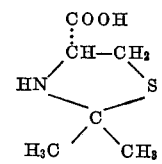

I as the starting material and to carry out the novel synthesis, for example, according to the following reaction scheme:

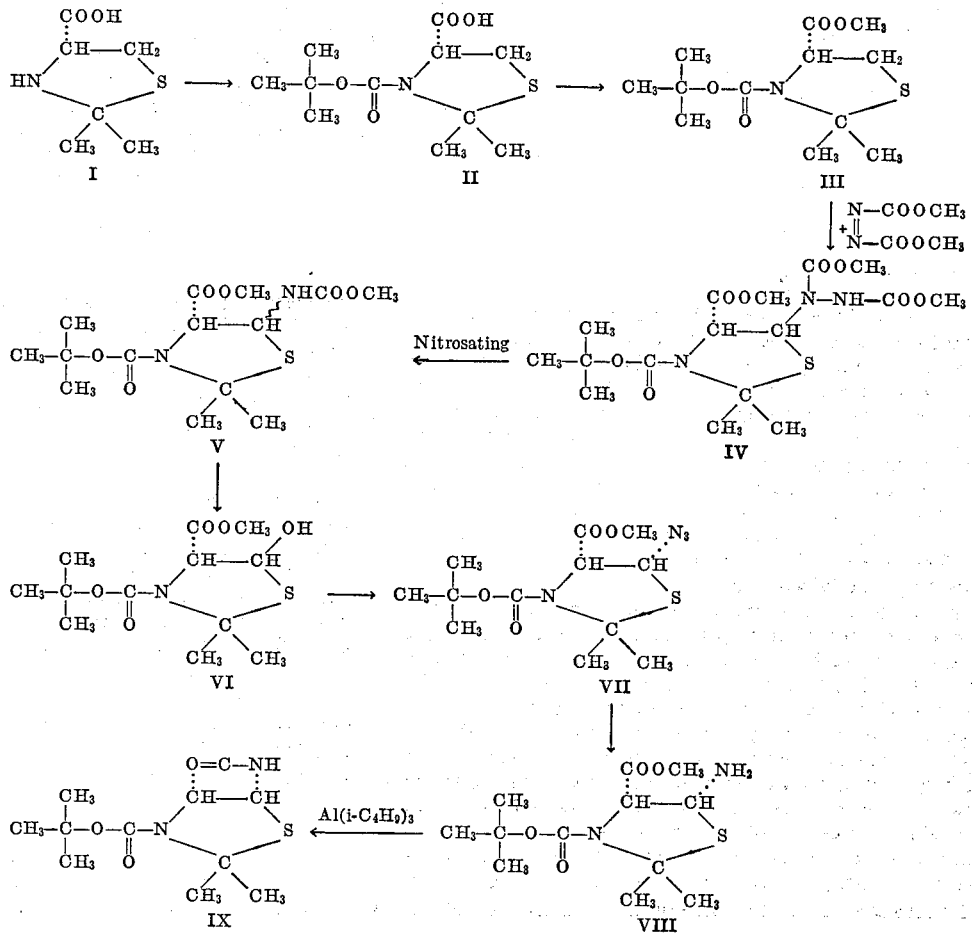

The compound IX is converted into the desired 7-amino-cephalosporanic acid and its derivatives as follows:

out with cooling (especially the nitrosation), as well as at room temperature and/or in an inert gas.

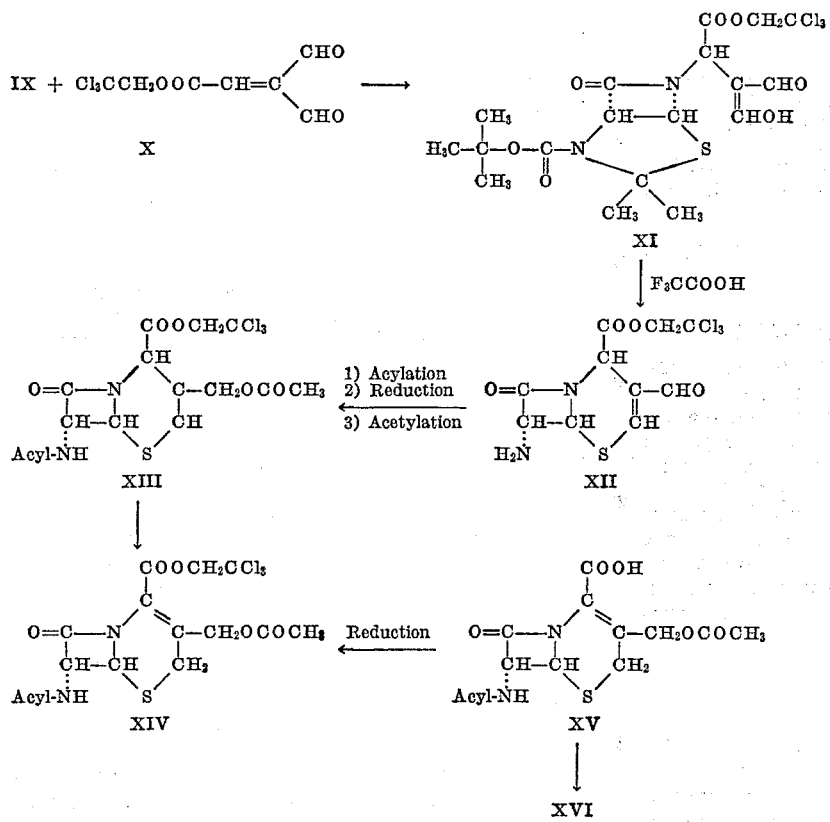

The compound of the Formula X used as intermediate is manufactured in the following manner:

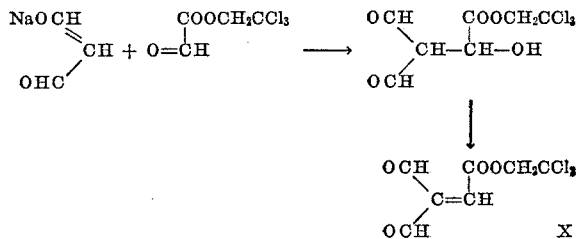

The urethane compounds, which are valuable intermediates, such as the compound V, are unexpectedly obtained by reacting a saturated cyclic α-hydrazino-thioether in which the hydrazino group is N,N'-disubstituted by esterified carboxyl groups, for example, the compound of the Formula IV, with a nitrosating agent, and treating the resulting product with a basic agent and, if desired, converting substituents present in a resulting compound into other substituents, and/or, if desired, resolving a resulting mixture of isomers into its component isomers.

The process of this invention consists in reacting the starting material with a nitrosating agent, such as a nitrosyl halide, for example, nitrosyl chloride, nitroso fluoborate or nitroso perchlorate, preferably in the presence of a basic agent, such as pyridine, or of an alkali metal nitrite, such as sodium nitrite, in the presence of a suitable acid, such as glacial acetic acid. The resulting intermediate containing a nitroso group can be converted into the desired product simultaneously or subsequently by treatment with a basic agent, for example, an alkali metal carbonate or bicarbonate, such as sodium carbonate, or with an alkali metal hydroxide, or with an organic base, such as pyridine, which may at the same time serve as diluent for the nitrosating reaction, if necessary in the presence of a solvent. If necessary, the above-mentioned reactions are carried Substituents present in a resulting compound can be converted in known manner into other substituents. A resulting acid derivative, such as an ester, can be converted into the free acid without removing the acyl group, especially a readily eliminable acyl group, such as a tertiary butyloxycarbonyl group, in position 3. Thus, carbodiphenylmethoxy groups may be converted into free carboxyl groups under acidic conditions, for example, in the presence of catalytic amounts of acids, such as trifluoroacetic acid. A carboxyl group esterified with a 2,2,2-trihalogeno-ethanol, especially with 2,2,2-trichloroethanol can be converted into the free carboxyl group in a peculiar manner by means of a reducing agent. Suitable reducing agents are chemical reducing agents such as nascent hydrogen obtained, for example, by reacting metals, metal alloys or amalgams upon hydrogen donors such as zinc, zinc alloys, for example zinc copper, or zinc amalgam in the presence of acids, such as organic carboxylic acids, for example, acetic acid, or alcohols such as lower alkanols, alkali metal amalgams, for example, sodium or potassium amalgam, or aluminium amalgam, in the presence of moist ether or of a lower alkanol, as well as alkali metals, for example lithium, sodium or potassium, or alkaline earth metals, for example calcium, in liquid ammonia, if required or desired with addition of alcohols, such as a lower alkanol. Furthermore an ester of a 2,2,2-trihalogeno-ethanol, particularly 2,2,2-trichloroethanol can also be converted into the free acid by treatment with strongly reducing metal salts, such as chromium-II-compounds, for example, chromium-II-chloride or chromium-II-acetate, preferably in the presence of aqueous media, containing water-miscible organic solvents, such as lower alkanols, lower alkane carboxylic acids or ethers, such as methanol, ethanol, acetic acid, tetrahydrofuran, dioxan, ethyleneglycol dimethylether or diethyleneglycol dimethylether.

A free carboxyl group in a resulting compound may be converted in known manner into its functional derivatives, for example its esters, amides, hydrazides or azides. Thus, for example, it can be esterified by treatment with a diazo compound such as a diazo-lower alkane, for example diazomethane or diazoethane, or a phenyl-lower diazoalkane, such as diphenyldiazomethane, or by reaction with a hydroxy compound suitable for esterification, for example an alcohol, a phenol compound or an N-hydroxy-nitrogen compound, for example a hydroxamic acid, in the presence of an esterifying agent, such as a carbodiimide, for example dicyclohexyl carbodiimide, or of carbonyldiimidazole, or by any other known and suitable esterifying process, such as reaction of a salt of the acid with a reactive ester of the hydroxy compound, especially of an alcohol and a strong inorganic acid or a strong organic sulphonic acid, if desired in the presence of a salt-forming base. Amides are obtained in known manner, sulphonylamides, for example, also by treating the free carboxylic acid with a sulphonylisocyanate.

A fuctionally modified carboxyl group in a resulting compound can be converted in known manner into another functionally modified carboxyl grop, for example, an esterified carboxyl group by transesterification, such as treatment with a hydroxy compound in the presence of a transesterification catalyst. Furthermore, esters, especially activated esters, for instance esters with N-hydroxy-nitrogen compounds, or anhydrides formed with haloformic acid esters can be converted by reaction with other hydroxy compounds, such as alcohols or phenol compounds, as well as with ammonia, or with primary or secondary amines or hydrazines into other esters and amides or hydrazides, respectively. In a resulting amide or hydrazide compound comprising a hydrogen-containing nitrogen atom the latter can subsequently be substituted, for example, by treatment with a carboxylic or sulphonic acid derivative, such as an acid halide and/or a reactively esterified alcohol or by means of another suitable reagent. An N-unsubstituted amide can also be converted into the corresponding nitrile, for example, by dehydration.

A resulting mixture of isomers can be resolved into the individual isomers in known manner, for example, by fractional crystallization, adsorption chromatography (column or thin-layer chromatography) or by other methods. Resulting racemates can be resolved to form the antipodes by forming a mixture of diastereoisomeric salts with optically active salt-forming agents, separating the mixture into the diastereoisomeric salts and conversion of the isolated salts into the free compounds.

The compounds obtained according to this invention are saturated cyclic α-amino-thioethers, in which the amino group is N-substituted by an esterified carboxyl group, for example, 5-amino-thiazolidines N-substituted in the amino group by an esterified carboxyl group. These compounds are particularly 2,2-disubstituted 3-acyl-5-amino-thiazolidine-4-carboxylic acids in which the amino group is N-substituted by an esterified carboxyl group, and especially their functional derivatives, such as the compounds of the formula

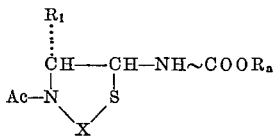

where Ac represents an acyl group, especially one of those mentioned above, X represents the disubstituted carbon atom of the thiazolidine ring, $R_1$ standards for a free or functionally modified carboxyl group and $R_a$ for the residue of an alcohol.

Acyl radicals Ac are in the first place those which occur in pharmacologically active N-acyl derivatives of 7-amino-cephalosporanic acid, for example, the thienylacetyl, e.g. 2-thienylacetyl, chloroethylcarbamyl or phenylacetyl radical, or readily eliminable acyl radicals, such as the residue of a carbonic acid semi-ester, for example the tertiary butyloxycarbonyl residue.

The residue —X— represents primarily the group of the formula

where $R_2$ and $R_3$ each stands for a hydrocarbon residue, especially an aliphatic hydrocarbon residue, such as a lower alkyl, for example ethyl, n-propyl, isopropyl or preferably methyl, or an aromatic group especially a phenyl group, or an araliphatic hydrocarbon residue, especially phenylalkyl, for example, benzyl or phenylethyl groups, as well as functionally converted, particulary esterified carboxyl groups, such as carbo-lower alkoxy, for example, carbomethoxy or carbethoxy groups, or $R_2$ and $R_3$ together may represent a bivalent hydrocarbon residue, especially a bivalent aliphatic hydrocarbon residue such as a lower alkylene group, for example 1,4-butylene or 1,5-pentylene, as well as a phthaloyl group, or an oxo or thiono group. The above-mentioned hydrocarbon residues are unsubstituted or may be substituted, for example, by lower alkyl, such as methyl or ethyl, by lower alkoxy, such as methoxy or ethoxy groups, halogen, such as fluorine, chlorine or bromine atoms, halogenalkyl, such as trifluoromethyl groups, or by other suitable groups.

The group $R_1$ is a free or preferably a functionally modified carboxyl group, especially an esterified carboxyl group. The latter is esterified with any hydroxy compound suitable for esterifying carboxylic acids, such as with aliphatic alcohols, for example, alkanols, particularly lower alkanols, for example, methanol, ethanol, n-propanol or tertiary butanol, or with cycloaliphatic alcohols, such as cycloalkanols, for example, cyclohexanol, or with araliphatic alcohols, such as phenylalkanols, for example, benzyl alcohol or diphenylmethanol, or with phenol compounds, especially phenol, or with N-hydroxy-nitrogen compounds, such as hydroxamic acids, for example, N-hydroxycarbamic acid esters, such as methyl ester, or with N-hydroxy-imides, for example, N-hydroxysuccinimide; the above-mentioned hydroxy compounds may be unsubstituted or substituted by lower alkyl, lower alkoxy, nitro or trifluoromethyl groups or especially by halogen atoms or other groups. Substituted hydroxy compounds particularly suitable for esterifying carboxylic acids are halogenated lower alkanols, such as 2,2,2-trichloroethanol.

Other functionally modified carboxyl groups, $R_1$ are, for example nitrogen-containing functionally modified carboxyl groups, such as carbamyl groups which may be unsubstituted or mono- or disubstituted on the nitrogen atom by aliphatic, alicyclic, aromatic or araliphatic hydrocarbon residues or heterocyclic residues of aromatic character, which may optionally contain lower alkyl groups or free, esterified or etherified hydroxyl groups, such as lower alkoxy, aralkoxy, lower alkanoyloxy or aroyloxy groups or halogen atoms, nitro or trifluoromethyl groups as substituents, such residues being lower alkyl, cycloalkyl, phenyl, phenyl-lower alkyl, phenyl-lower alkylidene or pyridyl residues, or by free, etherified or esterified hydroxyl groups (such as those mentioned above), by phosphoriferous residues or by acyl radicals, such as the radicals of carboxylic acids, for example, residues of carbonic acid semi-esters or semi-amides, or lower alkanoyl residues, or of sulphonic such as arylsulphonic acids, for example, phenylsulphonyl residues, as well as nitrile or azidocarbonyl groups or by hydrazinocarbonyl or azocarbonyl groups which may be mono- or polysubstituted on the nitrogen atom, for example, by the above-mentioned substitutents of the carbamyl group.

Residues of alcohols $R_a$ are, for example, the residues of the above-mentioned alcohols suitable for esterifying the carboxyl groups $R_1$, especially those of aliphatic alcohols such as lower alkanols, or substituted, in the first place halogenated, lower alkanols.

The invention includes also any modification of the present process in which a compound obtained as an intermediate is used as starting material and any remaining step/steps is/are carried out with it. Thus, for example the intermediately obtained saturated cyclic α-N'-nitroso-hydrazino-thioethers in which the hydrazino group is N,N'-disubstituted by esterified carboxyl groups, such as 5-N'-nitroso-hydrazino-thiazolidines, N,N'-disubstituted in the hydrazino group by esterified carboxyl groups, especially 2,2-disubstituted 3-acyl-5-N'-nitroso-hydrazino-thiazolidine-4-carboxylic acids in which the hydrazino group is N,N'-disubstituted by esterified carboxyl groups and their functional derivatives, such as the compound of the formula

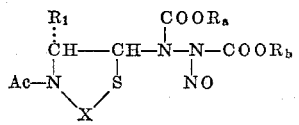

where Ac, $R_1$, $R_a$ and X have the above meanings and $R_b$ represents the residue of an alcohol—may be isolated and converted into the desired products by treatment with a basic agent.

The invention includes also any modification of the present process in which the process is discontinued at any stage thereof, or in which the starting materials are used in the form of derivatives, for example of salts, or are formed during the reaction.

Preferably used starting materials and reaction conditions are those which give rise to the preferred compounds specially mentioned above.

The starting materials used in the above process are manufactured by the process described in patent application Serial No. 573,816, filed August 22, 1966.

The process products are particularly valuable intermediates for use in the manufacture of saturated cyclic α-hydroxy-thioethers, for example, 5-hydroxy-thiazolidines, more especially for the manufacture of 2,2-disubstituted 3-acyl-5-hydroxy-thiazolidine-4-carboxylic acids and in the first place of their functional derivatives, especially of compounds of the Formula VIa

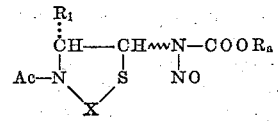

VIa where Ac, X and $R_1$ have the above meanings, such, for example, as the compound of the Formula VI in the preceding reaction scheme.

These products are unexpectedly obtained when a saturated cyclic α-amino-thioether obtained by the present process, the amino group of which is substituted by an esterified carboxyl group, is treated with a nitrosating agent and simultaneously or subsequently with a basic reagent and, if desired, a substituent present in a resulting compound is converted into another substituent, and/or, if desired, a resulting mixture of isomers is resolved into its component isomers.

The above reaction is carried out as described above for the nitrosation. Substituents in a resulting compound can be converted into other substituents, for example by the above process, or a resulting mixture of isomers can be resolved into its component isomers as mentioned above.

The invention further includes any modification of the present process in which an intermediately obtained compound, that is to say a saturated cyclic α-nitrosoamino-thioether, for example, a 5-N-nitrosoamino-thiazolidine the amino group of which is substituted by an esterified carboxyl group, especially a 2,2-disubstituted 3-acyl-5-nitrosoamino-thiazolidine-4-carboxylic acid, in which the amino nitrogen atom is substituted by an esterified carboxyl group, or a functional derivative thereof, such as a compound of the formula

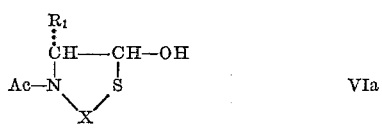

where Ac, X, $R_1$ and $R_a$ have the above meanings—is used as starting material and any remaining step or steps is or are carried out with it, or in which starting materials or intermediates are formed in situ or are used in the form of their derivatives.

In a resulting compound with a free hydroxyl group, the latter can be converted into an acyloxy group, for example, by treatment with a suitable derivative of an organic carboxylic acid, such as a halide or anhydride thereof, or by converting the hydroxy group into a reactive esterified hydroxy group, such as a halogen, e.g. chlorine or bromine atom (for example, by treatment with a suitable acid halide, e.g. phosgene) or an organic sulfonyloxy group, such as a methane sulfonyloxy or p-toluene sulfonyloxy group (for example, by treatment with a suitable organic sulfonic acid halide) and treatment of the resulting intermediate with an organic carboxylic acid or preferably a salt, such as an alkaline metal salt thereof.

The compounds obtained according to the present invention can be converted into 7-amino-cephalosporanic acid and its derivatives as illustrated by the scheme of reaction equations: This conversion may be carried out, for example, by the process described in the following patent applications: Ser. No. 573,865, filed Aug. 22, 1966; Ser. No. 573,815, filed Aug. 22, 1966; Ser. No. 573,886, filed Aug. 22, 1966; Ser. No. 573,866, filed Aug. 22, 1966; and Ser. No. 573,876, filed Aug. 22, 1966.

The following examples illustrate this invention.

EXAMPLE 1

A solution of 10 g. of L-2,2-dimethyl-3-tertiary butyloxycarbonyl - 5β - (N,N' - dicarbomethoxy - hydrazino)-thiazolidine-4-carboxylic acid methyl ester in 135 ml. of pyridine is cooled to −14 to −16° C. by means of an ice-salt mixture and 13 ml. of nitrosyl chloride are tipped in. The reaction mixture is maintained for 205 minutes at −12 to −14° C. and then poured over a mixture of 1000 ml. of ice and 2000 ml. of water. The supernatant solution is drawn off and the residue dissolved in 500 ml. of methylene chloride. The organic solution is washed with saturated sodium chloride solution, dried and evaporated. The residue contains the L-2,2-dimethyl-3-tertiary butyloxycarbonyl - 5β - (N,N' - dicarbomethoxy - N' - nitroso-hydrazino)-thiazolidine-4-carboxylic acid methyl ester of the formula

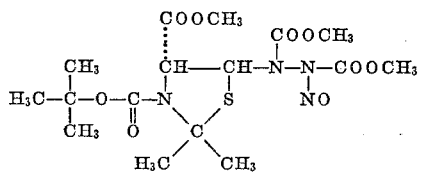

a mixture of which in 210 ml. of methanol and 280 ml. of methylene chloride is stirred for 38 hours with 1.7 g. of anhydrous sodium carbonate. The solvents are evaporated, the residue is distributed between water and methylene chloride and the organic phase is washed with saturated sodium chloride solution, dried and evaporated, to yield L-2,2-dimethyl-3-tertiary butyloxycarbonyl-5β-

(N-carbomethoxy-amino)-thiazolidine-4-carboxylic acid methyl ester of the formula

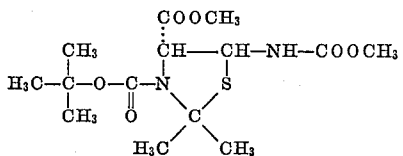

as a crude product which can be purified by crystallization from methylene chloride and hexane. It melts at 144–145° C. Optical rotation $[\alpha]_D = +168° \pm 8°$ (c.=0.1538 in chloroform). Infrared absorption bands (in methylene chloride) at 2.9μ (broad) and 5.85μ (broad). A further quantity of the product is obtained from the mother liquor and from the sucked off aqueous pyridine solution.

EXAMPLE 2

A stirred solution of 4.03 g. of L-2,2-dimethyl-3-tertiary butyloxycarbonyl-5β-(N-carbomethoxy - amino)-thiazolidine-4-carboxylic acid methyl ester in 60 ml. of dioxane and 60 ml. of water is mixed within 38 hours with 15 ml. of 1 N sodium hydroxide solution. The reaction mixture is then evaporated to about half its initial volume, diluted with water and extracted with ether. The aqueous phase is acidified with citric acid and extracted four times with methylene chloride. The combined organic extracts (500 ml.) are washed with saturated aqueous sodium chloride solution, dried and evaporated. The rubber-like residue is taken up in 9 ml. of methylene chloride. The desired L-2,2-dimethyl-3-tertiary butyloxycarbonyl - 5β - (N - carbomethoxy - amino)- thiazolidine-4-carboxylic acid of the formula

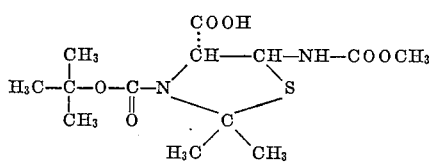

crystallizes immediately and is washed with methylene chloride; its melts at 185–187° C. (with decomposition). Optical rotation $[\alpha]_D = +240° \pm 1°$ (c.=0.705 in chloroform). Infrared absorption bands (in mineral oil) at 2.95, 5.8 and 6.2μ.

EXAMPLE 3

A solution of 3.117 g. of L-2,2-dimethyl-3-tertiary butyloxycarbonyl - 5β - (N - carbomethoxy-amino)-thiazolidine-4-carboxylic acid in 90 ml. of anhydrous benzene is mixed with 1.5 ml. of triethylamine; when a clear solution has formed 1.45 ml. of benzene sulphonylisocyanate are added under the exclusion of moisture. The exothermic reaction is controlled by means of water-cooling and the mixture is kept for 6 hours at room temperature and then poured into a solution of 6 g. of citric acid in 150 ml. of water. The batch is agitated, the aqueous phase extracted with 100 ml. of methylene chloride and the combined organic solutions are washed with 100 ml. of water and evaporated. The residue is purified by a counter-current distribution between benzene and a phosphate buffer (pH= about 5.9) in 6 separating funnels containing 300 ml. each of the two phases. The aqueous phases are acidified with citric acid (pH=about 3 to 4) and extracted with methylene chloride. The benzene solution and the methylene chloride washing solution of each fraction are combined and the fractions of the first 4 separating funnels together yield pure L-2,2-dimethyl-3-tertiary butyloxycarbonyl-5β-(N-carbomethoxy-amino)-thiazolidine-4-carboxylic acid N-phenylsulphonylamide of the formula

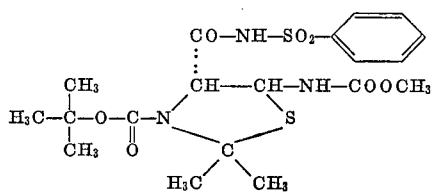

After crystallization from ether and pentane and recrystallisation from a mixture of methylene chloride, ether and pentane it melts at 100–203° C. Optical rotation $[\alpha]_D^{20} = +11° \pm 1°$ (c.=1.124 in chloroform). Infrared absorption bands (in methylene chloride) at 2.92, 5.75, 5.89, 6.26, 6.74, 7.41, 8.43 and 9.21μ.

EXAMPLE 4

0.15 ml. of nitrosyl chloride is tipped into a solution of 0.102 g. of L-2,2-dimethyl-3-tertiary butyloxycarbonyl-5β - (N - carbomethoxy - amino) - thiazolidine - 4 - carboxylic acid methyl ester in 4 ml. of pyridine cooled with a salt-ice mixture. The batch is stirred for 1 hour at −10° C. and the reaction mixture, which contains L-2,2-dimethyl-3-tertiary butyloxycarbonyl - 5β - (N - carbomethoxy-N-nitrosoamino) - thiazolidine - 4 - carboxylic acid methyl ester of the formula

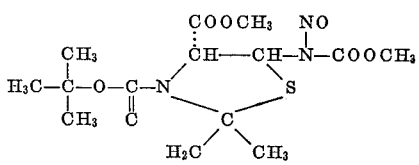

is diluted with 40 ml. of water, stirred overnight and then washed with saturated sodium chloride solution and extracted with methylenechloride. The organic extract is evaporated and the residue chromatographed on silica gel. Elution with a 9:1-miture of benzene and ethyl acetate furnishes pure L-2,2-dimethyl-3-tertiary butyloxycarbonyl-5β-hydroxy-thiazolidine-4-carboxylic acid methyl ester of the formula

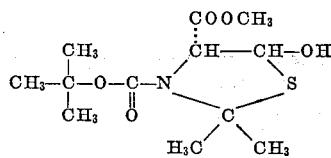

which, after having been dried at 90° C. under 0.01 mm. Hg pressure for 3 hours, melts at 101–102° C. Optical rotation $[\alpha]_D = +48° \pm 1°$ (c.=1.14 in chloroform). Infrared absorption bands (in chloroform) at 2.80, 5.75, 5.95, 7.35, 8.65 and 9.35μ. End absorption in the ultraviolet spectrum (in 95% ethanol).

EXAMPLE 5

0.15 ml. of nitrosyl chloride is tipped into a stirred solution of 0.15 g. of L-2,2-dimethyl-3-tertiary butyloxycarbonyl - 5β - (N-carbomethoxy-amino)-thiazolidine-4-carboxylic acid N-phenylsulphonylamide in 6 ml. of pyridine which has been cooled to −15° C. with an ice-salt mixture. The reaction mixture is stirred for 1½ hours at −15° C. and then for 20 hours at room temperature and filtered. The filtrate is acidified with citric acid and extracted three times with methylenechloride. The organic extracts are washed with saturated sodium chloride solution, dried and evaporated and the crude product purified by countercurrent extraction with a buffer of pH 6.4. Pure L-2,2 - dimethyl-3-tertiary butyloxycarbonyl-5β-hydroxy-thiazolidine-4-carboxylic and N-phenylsulphonylamide of the formula

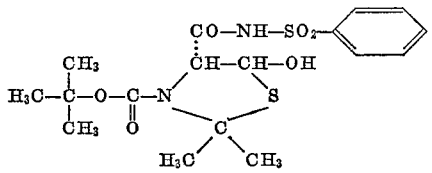

crystallizes from a mixture of methylene chloride and hexane and melts at 164 to 165° C. Optical rotation [α]_D=—26°±1° (c.=1.62 in chloroform). Infrared absorption bands (in methylene chloride) at 2.75, 3.00, 5.85 and 6.075μ.

EXAMPLE 6

A mixture of 0.2 g. of L-2,2-dimethyl-3-tertiary butyloxycarbonyl - 5β - carbomethoxyamino - thiazolidine - 4-carboxylic acid, 0.084 g. of 4-nitrophenol and 0.124 g. of dicyclohexyl carbodiimide is diluted with 6 ml. of ether and the suspension is stirred for 24 hours at room temperature. The reaction mixture is filtered, the filtrate evaporated and the residue taken up in 3 ml. of benzene. A trace of pyridine is added and the whole stirred overnight. The reaction mixture is filtered, the filtrate evaporated and the residue taken up in ether. The organic solution is washed with a saturated sodium hydrogen carbonate solution and a saturated sodium chloride solution, dried and evaporated. Crystallization of the crude product from carbon tetrachloride furnishes pure L-2,2-dimethyl-3-tertiary butyloxycarbonyl - 5β-carbomethoxyamino-thiazolidine-4-carboxylic acid-4'-nitrophenyl ester of the formula

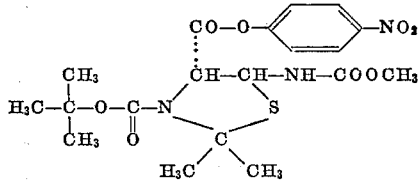

melting at 103° C. Infrared absorption bands (in methylene chloride) at 2.9 and 6.5μ.

EXAMPLE 7

A solution of 0.09 g. of L-2,2-dimethyl-3-tertiary butyloxycarbonyl - 5β - carbomethoxyamino-thiazolidine-4-carboxylic acid in aqueous dioxane is mixed with 3 ml. of aqueous normal sodium hydroxide solution and kept for 16 hours. The reaction mixture is acidified with citric acid and extracted wtih methylene chloride. The aqueous phase is extracted with ethyl acetate, to yield crude L-2,2 - dimethyl-3-tertiary butyloxycarbonyl-5β-amino-thiazolidine-4-carboxylic acid of the formula

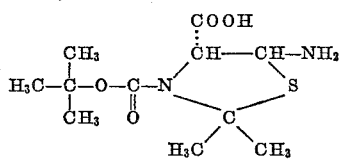

which reveals in the infrared spectrum absorption bands (in methylene chloride) at 3.5 and 6μ.

EXAMPLE 8

A solution of 1.145 g. of L-2,2-dimethyl-3-tertiary butyloxycarbonyl - 5β - hydroxy-thiazolidine-4-carboxylic acid methyl ester in 3.0 ml. of ethanol-free methylene chloride is treated with 30 ml. of triethylamine and then during 2 minutes with phosgene. The mixture starts to boil and triethylammonium chloride precipitates; it is immediately concentrated under reduced pressure to about 5 g. to a half-crystalline residue which is extracted several times with warm ether. After filtering, the organic solvent is concentrated under water pump vacuum and the oily residue, containing the L-2,2-dimethyl-3-tertiary butyloxycarbonyl - 5-chloro-thiazolidine-4-carboxylic acid methyl ester of the formula

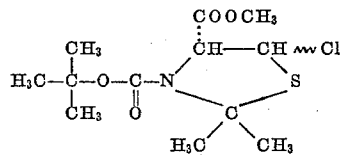

is dissolved without further purification in 20 ml. of acetic acid and stirred with 2 g. of sodium acetate. The clear solution is becoming turbid (precipitation of sodium chloride) and after 2 hours, the dispersion is evaporated under reduced pressure; at the end a small amount of toluene is added, and also evaporated. The residue is taken up in 50 ml. of water and 50 ml. of methylene chloride, the organic phase is washed twice with 50 ml. of water, dried and evaporated under reduced pressure. The oily residue crystallizes and is taken up in 5 ml. of a 1:1-mixture of hexane and pentane. The crystalline product is filtered off and represents the L-2,2-dimethyl-3-tertiary butyloxycarbonyl-5β-acetyloxy-thiazolidine-4-carboxylic acid methyl ester, which melts at 145–148° after washing with pentane.

The hexane-pentane-solution is evaporated and the oily residue is chromatographed on 50 g. of silica gel, the column being prepared with benzene:

| Fraction | Solvent | Ml. | Weight (in g.) |
|---|---|---|---|
| 1 | Benzene | 100 | 0.001 |
| 2 | Benzene containing 5% ethyl acetate. | 100 | 0.001 |
| 3 | do | 100 | 0.265 (oil) |
| 4 | do | 50 | 0.127 (oil) |
| 5 | do | 52 | 0.139 (oil) |
| 6 | do | 50 | 0.072 (oil) |
| 7 | do | 50 | 0.018 (oil) |
| 8 | do | 50 | 0.008 (oil) |

Fractions 5–8 are taken together and distilled; the desired L-2,2-dimethyl-3-tertiary butyloxycarbonyl-5α-acetyloxythiazolidine-4-carboxylic acid methyl ester of the formula is obtained at 100°/0.001 mm. Hg; [α]_D^20=—331°±1° (c.=0.88 in chloroform); infrared absorption spectrum (in methylene chloride) at 5.72, 5.87, 7.35, 8.20, 8.60, 9.30, 9.85 and 10.65μ, the last band being particularly strong and absent in the spectrum of the corresponding L-2,2-dimethyl-3-tertiary butyloxycarbonyl-5β-acetyloxythiazolidine-4-carboxylic acid methyl ester. The latter shows in the infrared absorption spectrum (in methylene chloride) bands at 5.72, 5.90, 7.35, 8.23, 8.55, 9.32, 9.90 and 10.35μ; [α]_D=+203°±2° (c.=0.41 in chloroform).

Upon treatment of the resulting product with sodium acetate in methanol one obtains in good yield the L-2,2-dimethyl-3-tertiary butyloxycarbonyl-5β - hydroxy-thiazolidine-4-carboxylic acid methyl ester.

What is claimed is:

1. Process for the manufacture of a member selected from the group consisting of 2,2-di-lower alkyl substituted 3-acyl-5-amino-thiazolidine-4-carboxylic acid and an ester thereof, in which the amino group is substituted by a carboxyl group esterified with a member selected from the group consisting of lower alkanols and halogeno-lower alkanols, wherein a member selected from the group consisting of 2,2-di-lower alkyl substituted 3-acyl-5-hydrazino-thiazolidine-4-carboxylic acid and a lower alkyl or halogeno-lower alkyl ester thereof, in which the hydrazino group is N,N'-disubstituted by carboxyl groups esterified with a member selected from the group consisting of lower alkanols and halogeno-lower alkanols and acyl is the acyl residue of a semiester of carbonic acid, is reacted with a nitrosating agent selected from the group consisting of a nitrosyl halide, a nitrosofluoborate, a nitrosoperchlorate and an alkali metal nitrite, and the resulting product is treated with a basic agent.

2. Process as claimed in claim 1 wherein a member selected from the group consisting of a nitrosyl halide, nitrosofluoborate, and introsoperchloride in the presence of a basic agent is used as the nitrosating reagent.

3. Process as claimed in claim 1, wherein an alkali metal nitrite in the presence of an acid is used as the nitrosating agent.

4. Process as claimed in claim 1, wherein a member selected from the group consisting of an alkali metal carbonate, an alkali metal hydrogen carbonate, an alkali metal hydroxide and an organic base is used as the basic agent.

5. A compound of the formula

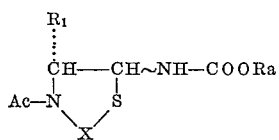

in which Ac is the acyl residue of a semiester of a carbonic acid, X is the group of the formula

in which $R_2$ and $R_3$ each is lower alkyl, $R_1$ is a member selected from the group consisting of a free carboxyl group, a carboxyl group esterified with a member selected from the group consisting of lower alkanols and halogeno-lower alkanols, a carbamyl group, a nitrile group, an azidocarbonyl group, a hydrazinocarbonyl group and an azocarbonyl group, and $R_a$ represents the radical of a member selected from the group consisting of a lower alkanol and a halogeno-lower alkanol.

6. A compound as claimed in claim 5, in which X has the formula

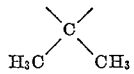

Ac is the acyl residue of a semiester of carbonic acid, $R_1$ represents a member selected from the group consisting of a free carboxyl group, a carboxyl group esterified by a lower alkanol and a carboxyl group esterified by a halogenated lower alkanol, and $R_a$ is a radical of an alcohol selected from the group consisting of lower alkanols and halogenated lower alkanols.

7. A compound as claimed in claim 5 and being L-2,2-dimethyl-3-tertiary butyloxycarbonyl-5β-(N-carbomethoxyamino)-thiazolidine-4-carboxylic acid methyl ester.

8. A compound as claimed in claim 5 and being a member selected from the group consisting of L-2,2-dimethyl-3-tertiary butyloxycarbonyl-5β-(N-carbomethoxy-amino)-thiazolidine-4-carboxylic acid and L-2,2-dimethyl-3-tertiary butyloxycarbonyl-5β-(N-carbomethoxy-amino)-thiazolidine-4-carboxylic acid 4-nitrophenyl ester.

9. A compound of the formula

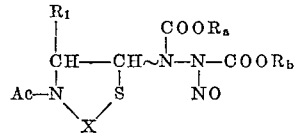

in which Ac is the acyl residue of a semiester of carbonic acid, X represents the group of the formula

in which $R_2$ and $R_3$ each is lower alkyl, $R_1$ is a member selected from the group consisting of a free carboxyl group, a carboxyl group esterified with a member selected from the group consisting of lower alkanols and halogeno-lower alkanols, a carbamyl group, a nitrile group, an azidocarbonyl group, a hydrazinocarbonyl group and an azocarbonyl group, and each of $R_a$ and $R_b$ is a member selected from the group consisting of the residue of a lower alkanol and a halogeno-lower alkanol.

10. A compound as claimed in claim 9, in which X has the formula

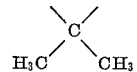

Ac is the acyl residue of a semiester of carbonic acid, $R_1$ represents a member selected from the group consisting of a free carboxyl group, a carboxyl group esterified by a lower alkanol and a carboxyl group esterified by a halogenated lower alkanol, and each of the groups $R_a$ and $R_b$ is a radical of an alcohol selected from the group consisting of lower alkanols and halogenated lower alkanols.

11. A compound as claimed in claim 9 and being L-2,2-dimethyl-3-tertiary butyloxycarbonyl-5β-(N,N'-dicarbomethoxy-N'-nitroso-hydrazino)-thiazolidine-4-carboxylic acid methyl ester.

12. A compound of the formula

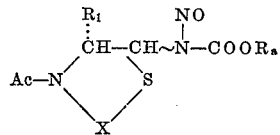

in which Ac represents the acyl residue of a semiester of carbonic acid, X represents the group of the formula

in which each of $R_2$ and $R_3$ is lower alkyl, $R_1$ stands for a member from the group consisting of a free carboxyl group, a carboxyl group esterified with a member selected from the group consisting of lower alkanols and halogeno-lower alkanols, a carbamyl group, a nitrile group, an azidocarbonyl group, a hydrazinocarbonyl group and an azocarbonyl group, and $R_a$ represents the radical of an aliphatic alcohol selected from the group consisting of lower alkanols and halogenated lower alkanols.

13. A compound as claimed in claim 10, in which X has the formula

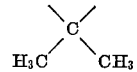

Ac is the acyl residue of a semiester of carbonic acid, $R_1$ represents a member selected from the group consisting of a free carboxyl group, a carboxyl group esterified by a lower alkanol and a carboxyl group esterified by a halogenated lower alkanol, and $R_a$ is a radical of an alcohol selected from the group consisting of lower alkanols and halogenated lower alkanols.

14. A compound as claimed in claim 12 and being L-2,2-dimethyl-3-tertiary butyloxycarbonyl-5β-(N-carbomethoxy-N-nitroso-amino)-thiazolidine-4-carboxylic acid methyl ester.

References Cited

UNITED STATES PATENTS 3,009,854  11/1961  Russell _____ 260—482

ALEX MAZEL, Primary Examiner

R. J. GALLAGHER, Assistant Examiner

U.S. Cl. X.R.

260—243, 332.2